M. W. REED.
WHEEL TREAD.
APPLICATION FILED OCT. 3, 1919.
1,402,963.
Patented Jan. 10, 1922.
2 SHEETS—SHEET 1.
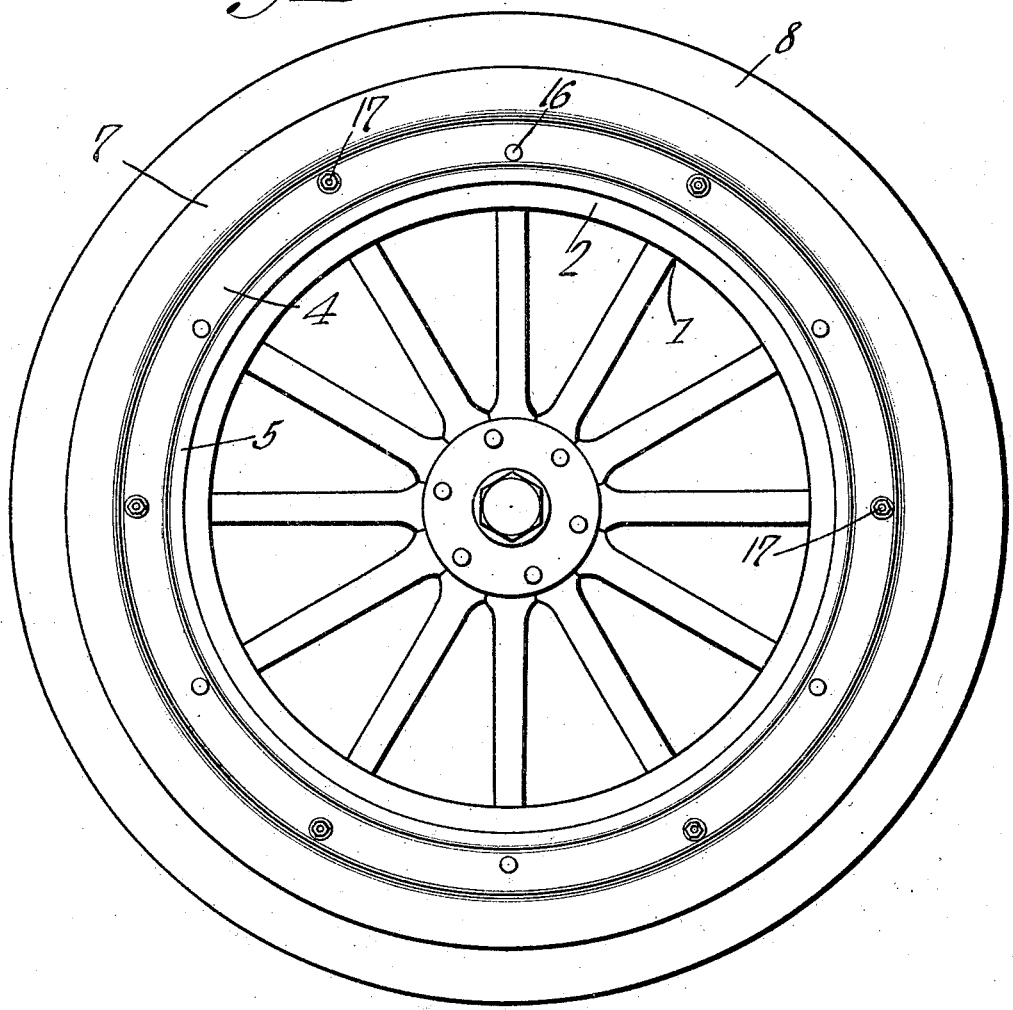
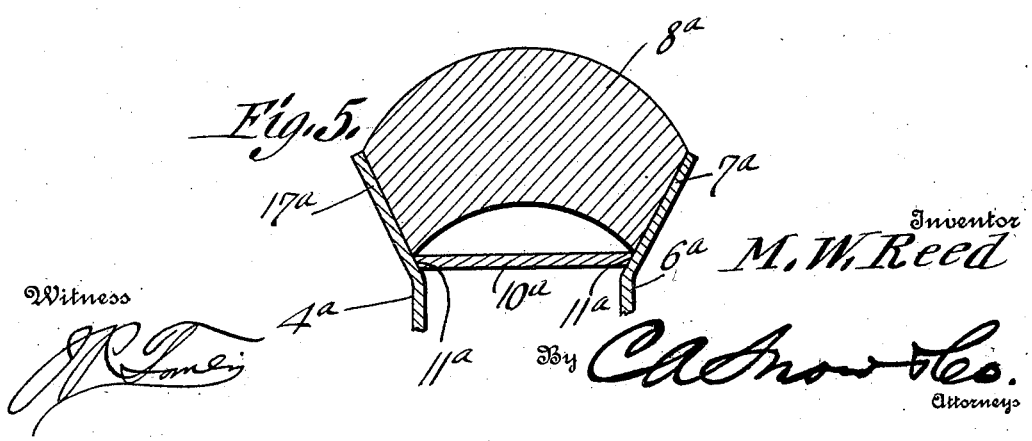

M. W. REED.
WHEEL TREAD.
APPLICATION FILED OCT. 3, 1919.
1,402,963.
Patented Jan. 10, 1922.
2 SHEETS—SHEET 2.
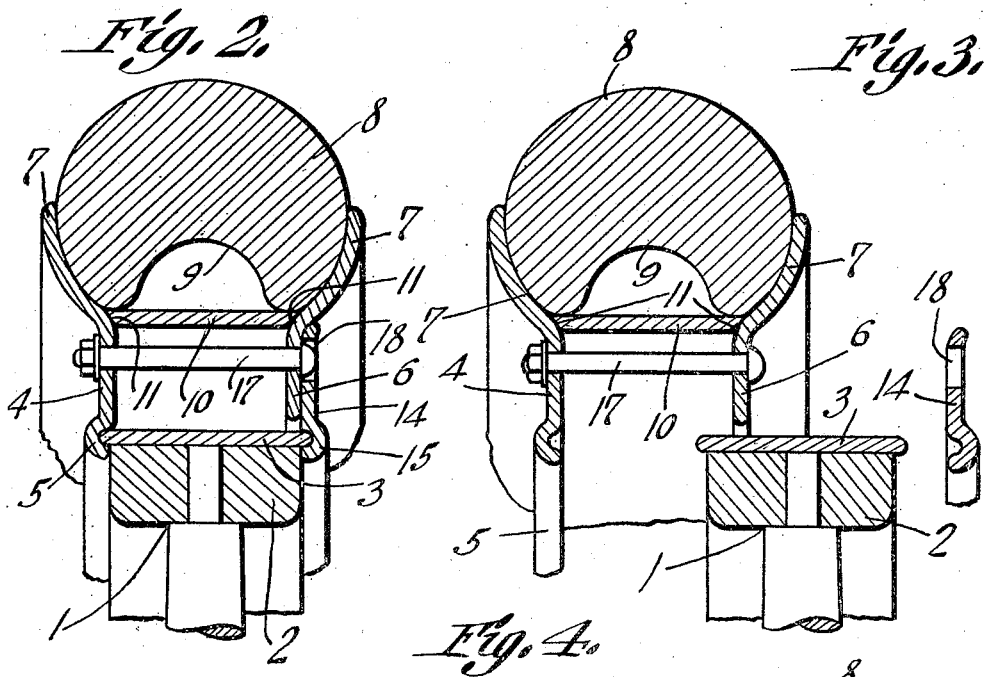
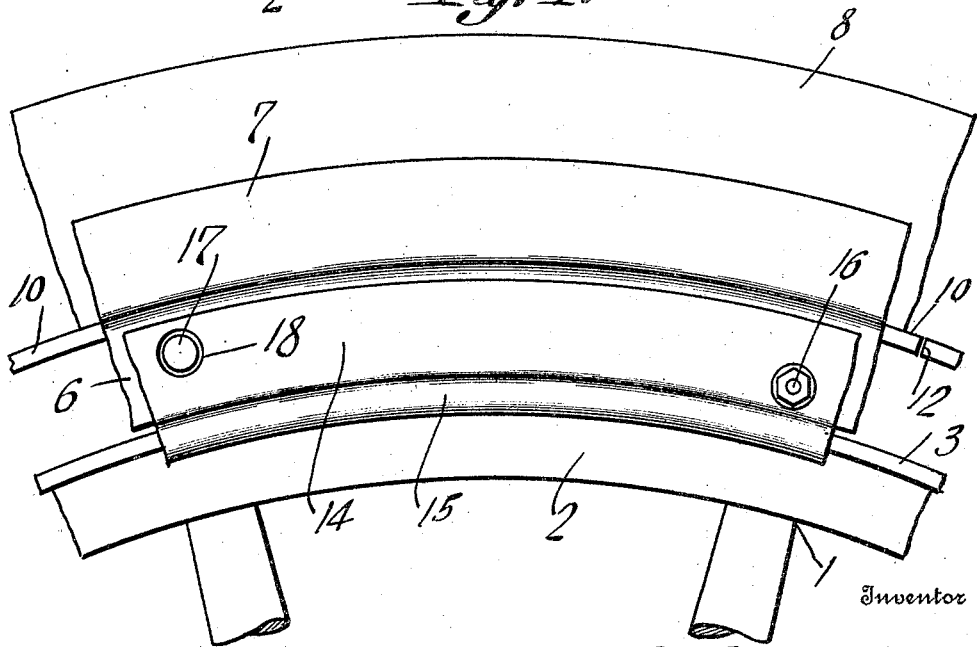

UNITED STATES PATENT OFFICE.

MELANCTHON W. REED, OF MARION, INDIANA.

WHEEL TREAD.

1,402,963.  Specification of Letters Patent.  Patented Jan. 10, 1922.

Application filed October 3, 1919. Serial No. 328,144.

*To all whom it may concern:*

Be it known that I, MELANCTHON W. REED, a citizen of the United States, residing at Marion, in the county of Grant and State of Indiana, have invented a new and useful Wheel Tread, of which the following is a specification.

One object of the present invention is to provide a wheel tread which will be yieldable and resilient without being subject to puncture. Another object of the invention is to provide a wheel tread which may be removed from a wheel body readily without taking apart the constituent members of the wheel tread. A further object of to provide novel means whereby the tire proper may be adjusted to vary the resiliency thereof.

Within the scope of what is claimed, a mechanic may work changes in the structure shown, without departing from the spirit of the invention.

In the drawings:—Figure 1 shows in side elevation, a wheel wagon whereon the tread hereinafter described has been mounted; Figure 2 is a cross section through the wheel body and parts associated therewith; Figure 3 is a cross section showing the parts as they will appear during the removal of a portion of the wheel tread; Figure 4 is a fragmental side elevation wherein parts are broken away; Figure 5 is a fragmental cross section showing a modification.

The numeral 1 marks a wheel body including a felly 2 carrying a felly band 3 forming part of the wheel tread hereinafter claimed. At 4 there appears a side plate having a trough-shaped offset 5 receiving one edge of the felly band 3. The numeral 6 designates a side plate having no element corresponding to the part 5 and of sufficient diameter so that it can move externally of the band 3 toward and away from the plate 4. The side plates 6 and 4 are provided with outwardly flaring flanges 7 which may be curved to conform to the cross section of a tire 8 which may be made of solid rubber or other suitable material. The tire 8 is supplied with a circumferential groove 9 in its inner edge. The numeral 10 denotes an expander in the form of a ring having beveled edges 11 cooperating with the inner surfaces of the flanges 7, the expander engaging the tire 8. The expander 10 may be severed at one or more places, as shown at 12 in Figure 4, to the end that the diameter of the expander may be increased or diminished in the operation of the device. A retaining ring 14 is provided, the same having a trough-shaped offset 15 receiving one edge of the felly band or base plate 3. The ring is provided with openings 18. Securing devices, such as bolts 16, connect the side plate 4 with the ring 14 and hold the offsets 5 and 15 in engagement with the edges of the felly band 3. The side plate 6 is mounted on the securing devices 16 for sliding movement toward and away from the side plate 4. Tightening devices 17, which may be bolts, connect the side plate 4 with the side plate 6, the heads of these bolts being received in the openings 18 of the ring 14.

When the bolts 16 are removed, the tire 8, the side plates 4 and 6 and the expander 10 may be slid laterally off the wheel body 1 without taking down the structure comprising the parts above enumerated. See Fig. 3.

The bolts 17 may be tightened up, thus drawing the side plate 6 inwardly. When the side plate 6 is drawn inwardly the beveled edges 11 of the expander 10 cooperate with the flanges 7 of the side plates 6 and 4, the diameter of the expander being increased, and the tire 8 being expanded and hardened accordingly. The operator, therefore, has within his command, a simple means whereby the resiliency of the tire 8 may be adjusted.

The flanges of the side plates need not be of the particular form shown in Figure 2. Thus, the flanges may be straight as shown in Figure 5: in that figure, parts hereinbefore described are designated by numerals previously used, with the suffix "a".

I claim:—

In a wheel tread, oppositely disposed side members, which are movable relatively toward each other, a tire between the side members, an expander between the side members and cooperating with the tire, and means for moving the side members toward each other, the side members having outwardly flaring surfaces which coact with the expander to move the expander outwardly upon the tire when the side members are moved relatively toward each other.

In testimony that I claim the foregoing as my own, I have hereto affixed my signature in the presence of two witnesses.

MELANCTHON W. REED

Witnesses:
 VERA ATHY,
 ALINE ESLER.